United States Patent
Hartman et al.

(10) Patent No.: US 8,533,232 B1
(45) Date of Patent: Sep. 10, 2013

(54) METHOD AND SYSTEM FOR DEFINING RELATIONSHIPS AMONG LABELS

(75) Inventors: Jed Hartman, Mountain View, CA (US);
Clive Saha, San Francisco, CA (US);
Astrid Atkinson, Boulder Creek, CA (US)

(73) Assignee: Google Inc., Mountain View, CA (US)

( * ) Notice: Subject to any disclaimer, the term of this patent is extended or adjusted under 35 U.S.C. 154(b) by 521 days.

(21) Appl. No.: 11/731,686

(22) Filed: Mar. 30, 2007

(51) Int. Cl.
*G06F 17/30* (2006.01)

(52) U.S. Cl.
USPC ........................................................ 707/794

(58) Field of Classification Search
USPC .................. 707/2, 6, 100–102, 794
See application file for complete search history.

(56) References Cited

U.S. PATENT DOCUMENTS

| | | | |
|---|---|---|---|
| 2001/0047358 A1* | 11/2001 | Flinn et al. | 707/100 |
| 2003/0154071 A1* | 8/2003 | Shreve | 704/9 |
| 2005/0114758 A1* | 5/2005 | Lang et al. | 715/512 |
| 2007/0150487 A1* | 6/2007 | Christian et al. | 707/100 |
| 2008/0027930 A1* | 1/2008 | Bohannon et al. | 707/6 |
| 2008/0082463 A1* | 4/2008 | Cheng et al. | 706/12 |
| 2008/0104032 A1* | 5/2008 | Sarkar | 707/3 |
| 2008/0140679 A1* | 6/2008 | Deyo et al. | 707/100 |

FOREIGN PATENT DOCUMENTS

WO     WO 2006/036127     *   4/2006

OTHER PUBLICATIONS

Wu, Xian, et al., "Exploring Social Annotations for the Semantic Web" May 23-26, 2006, ACM, p. 417-426.*
Mathes, Adam, "Folksonomies—Cooperative Classification and Communication Through Shared Metadata" Dec. 2004, www.adammathes.com <http://www.adammathes.com/academic/computer-mediated-communication/folksonomies.html>, p. 1-20.*
Stace, Brent, iPhoto5 2005 (snapshots taken Oct. 19, 2011), Apple, p. 1-14.*

* cited by examiner

*Primary Examiner* — Amresh Singh
(74) *Attorney, Agent, or Firm* — Morgan, Lewis & Bockius LLP

(57) ABSTRACT

In a content system where labels are used to organize content, relationships between labels may be defined. A relationship may be unidirectional or bidirectional. A label may have multiple relationships to or from other labels. When the user selects a first label, information corresponding to a second label may be displayed in accordance with the relationship between the first and second labels. Relationships between labels may also be inferred by examining the labels and the content associated with the labels.

20 Claims, 13 Drawing Sheets

| Label 1 | Relationship Type | Label 2 |
|---|---|---|
| SF | Synonym_of | San Francisco |
| AcmeCo | Child_of | Clients |
| Personal | More_important_than | Business |
| A | Related_to | B |
| Clients | Member_of | Business |
| Y | Relationship_x | Z |
| ⋮ | ⋮ | ⋮ |

FIG. 7

METHOD AND SYSTEM FOR DEFINING RELATIONSHIPS AMONG LABELS

TECHNICAL FIELD

The disclosed embodiments relate generally to content categorization, and more particularly, to methods and systems for defining relationships among labels or tags that may be associated with content.

BACKGROUND

The Internet has become a powerful medium for storage and sharing of content. Many web-based services, such as photo-sharing sites, blogs, and social bookmarking sites, are available for users to store content and to share content with other users. The growth of these services have also led to the growth of "folksonomy," in which users categorize content by assigning freely chosen keywords, tags, or labels to the content.

Folksonomy has some advantages, such as user freedom and its distributed nature. However, folksonomy also has some disadvantages. Because of the freedom of users to make up their own tags, there can be problems with users making up different tags for the same meaning and tags that may have multiple meanings. Furthermore, folksonomies tend to be unstructured. These disadvantages hinder efficient indexing and searching of tagged content by search engines.

Accordingly, there is a need for a more efficient manner of managing content tags.

SUMMARY

According to some embodiments, a method of labeling data items includes identifying a first label and a second label, the labels being distinct from a logical storage scheme associated with the data items; receiving a specification of a relationship between the first label and the second label; associating the first label with the second label in accordance with the relationship; applying the first label to the data items; and in response to a selection of the second label, presenting information associated with the data items based on the relationship.

According to some embodiments, a method of associating labels includes identifying a first label and a second label that are associated with respective data items; examining the first and second labels and the respective data items; inferring a relationship between the first label and the second label based on the examination; and associating the first label with the second label in accordance with the relationship.

According to some embodiments, the aforementioned methods may be performed by a system having memory and one or more processors.

According to some embodiments, instructions for performing the aforementioned methods may be included in a computer program product.

BRIEF DESCRIPTION OF THE DRAWINGS

FIG. 7 illustrates an exemplary data structure for storing label relationships, in accordance with some embodiments.

Like reference numerals refer to corresponding parts throughout the drawings.

DESCRIPTION OF EMBODIMENTS

A user can tag or label content with tags or labels (both "tags" and "labels" are used interchangeably throughout this description) and specify relationships between individual content items by defining relationships between the tags or labels. The relationships may be selected from a pre-specified set. Arbitrary relationships may also be specified. Additionally, relationships between labels may be inferred by examining the labels and the content associated with the labels.

Figure 1:
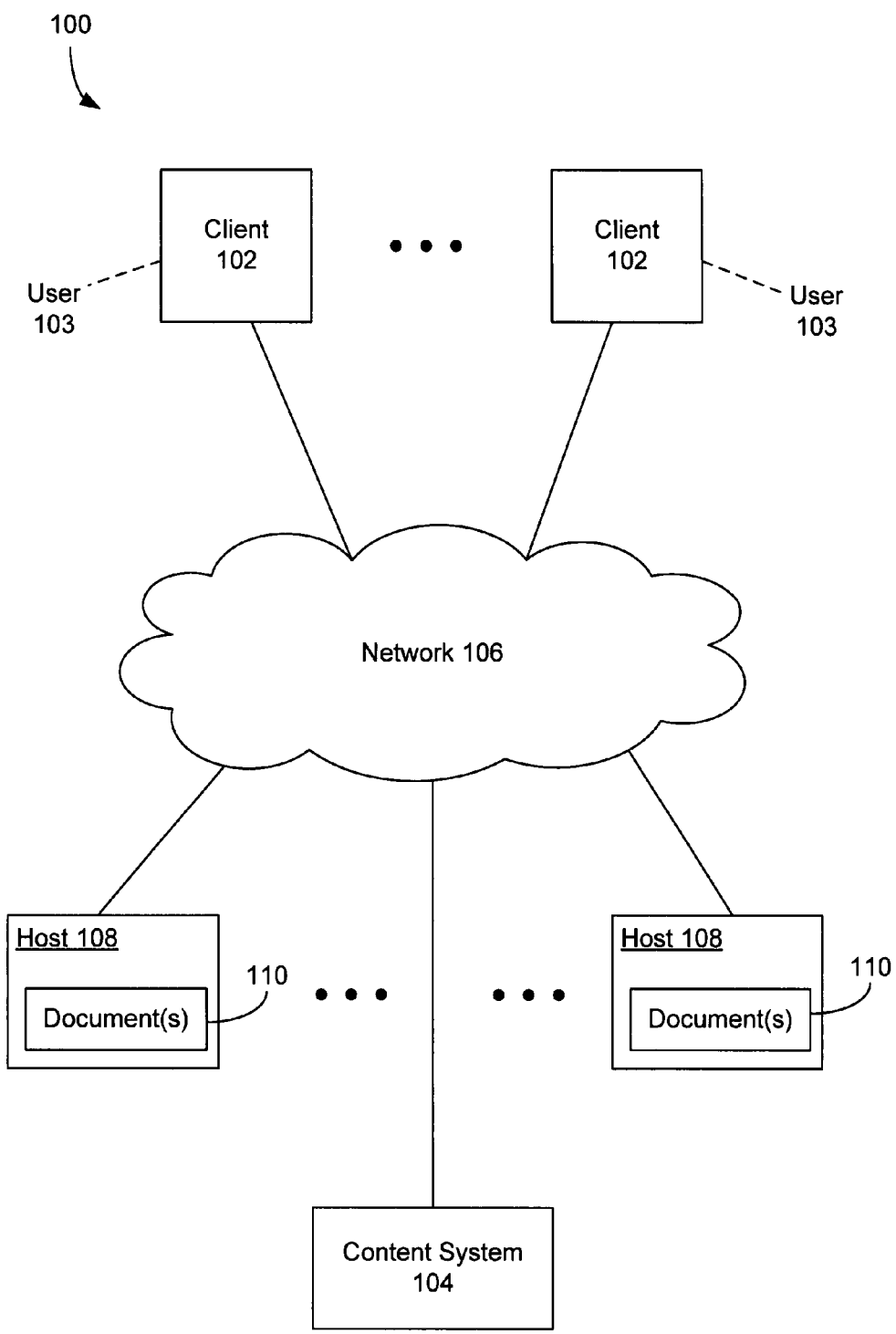
FIG. 1 is a block diagram illustrating a computer network, in accordance with some embodiments.

FIG. 1 is a block diagram illustrating a computer network, in accordance with some embodiments. The computer network 100 includes one or more clients 102, a content system 104, and a plurality of hosts 108 hosting documents 110. A network 106 interconnects these components. The network 106 may include, without limitation, local-area networks (LAN), wide-area networks (WAN), wireless networks, and the Internet.

The clients 102 are devices from which a user 103 may access content. The client may be any device capable of communicating with other computers, devices, and so forth through the network 106. Examples of client devices may include, without limitation, desktop computers, notebook (or laptop) computers, personal digital assistants (PDAs), mobile phones, network terminals, and so forth. In some embodiments, the client device includes one or more applications for communicating with other computers or devices through the network 106. Examples of such applications include, without limitation, web browsers, email applications, and instant messaging or chat applications. The client device may also include utility applications, such as calendar/scheduling, contact management, and or task management applications.

The content system 104 stores content or data items and provides same to clients 102. The content or data items may include documents such as web pages, electronic messages, images, other digital media content such as audio and video files, links to such, etc. In some embodiments, the content system 104 may include one or more content servers.

The content system 104 allows a user to organize content by labeling or tagging the content. A user may assign one or more labels or tags to his content or data items. A label may be completely arbitrary, or may be chosen to provide a hint of the subject matter of the content. A label may be assigned to multiple data items, and a data item may have multiple labels assigned to it.

Figure 2:
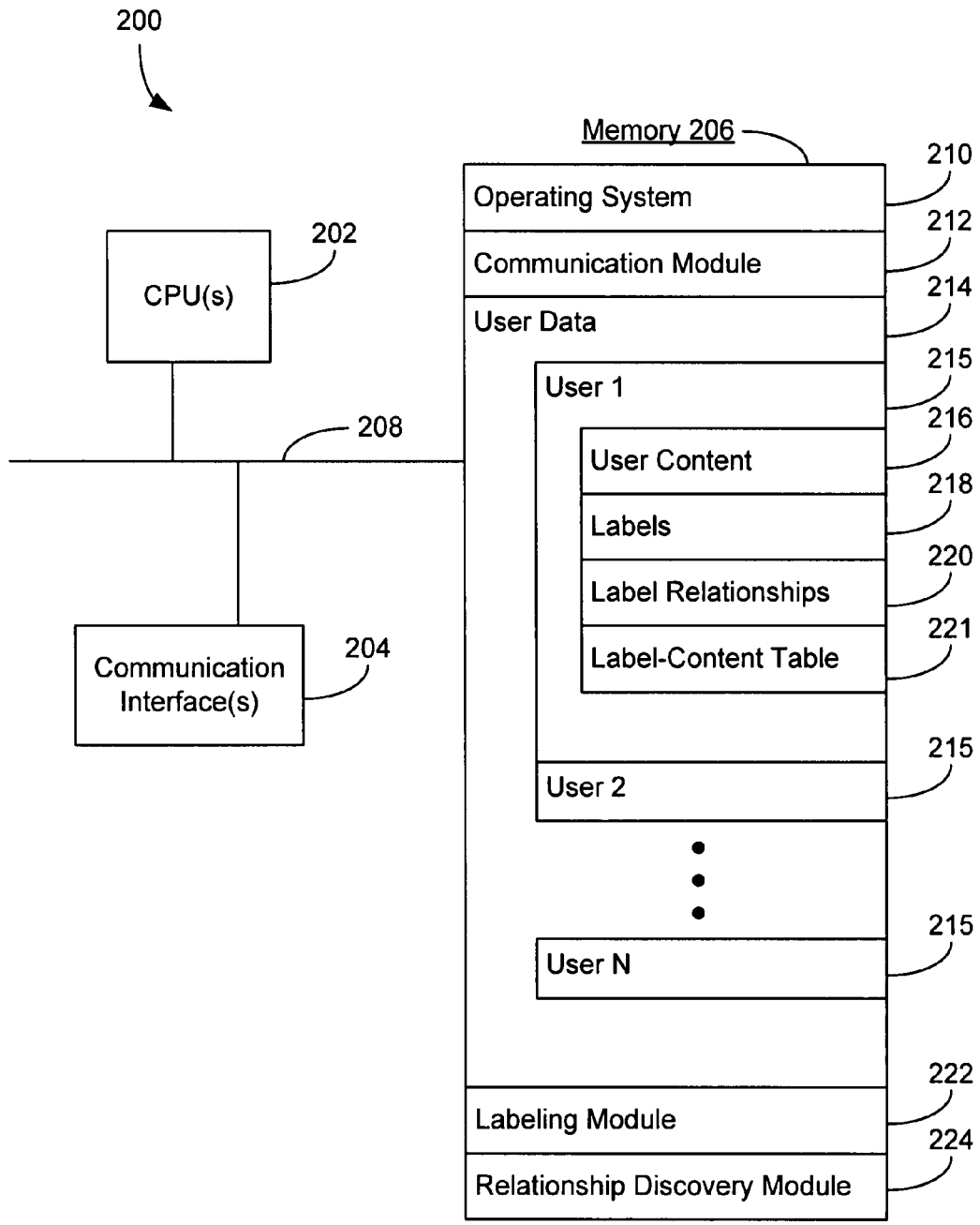
FIG. 2 is a block diagram illustrating a content server, in accordance with some embodiments.

FIG. 2 is a block diagram illustrating a content server 200, in accordance with some embodiments. The content server 200 typically includes one or more processing units (CPU's) 202, one or more network or other communications interfaces 204, memory 206, and one or more communication buses 208 for interconnecting these components. The content server 200 optionally may include a user interface comprising a display device and a keyboard and/or a mouse (not shown). Memory 206 includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. In some embodiments, memory 206 stores the following programs, modules and data structures, or a subset thereof:

- an operating system 210 that includes procedures for handling various basic system services and for performing hardware dependent tasks;
- a network communication module 212 that is used for connecting the content server 200 to other computers via the one or more communication network interfaces 204 (wired or wireless), such as the Internet, other wide area networks, local area networks, metropolitan area networks, and so on;
- user data 214 for storing per-user data;
- a labeling module 222 for labeling content and setting relationships between labels; and
- a relationship discovery module 224 for discovering and suggesting possible relationships between labels.

The user data 214 stores data and content associated with user accounts 215, or with other digital data or content designated by a user (e.g., images from the World Wide Web or other network 106). The data or content stored under a user account 215 may include the following, or a subset thereof:

- content 216, which may include content uploaded to the content server 200 by the user (or someone else) and documents for which the user has created links, pointers, or bookmarks;
- labels or tags 218, for labeling or tagging the content 216;
- label relationships 220, for specifying relationships between labels; and
- a label-content mapping or table 221 for mapping associations between labels and content or data items.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows a content server, FIG. 2 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a content server and how features are allocated among them will vary from one implementation to another, and may depend in part on the amount of data traffic that the system must handle during peak usage periods as well as during average usage periods.

Figure 3:
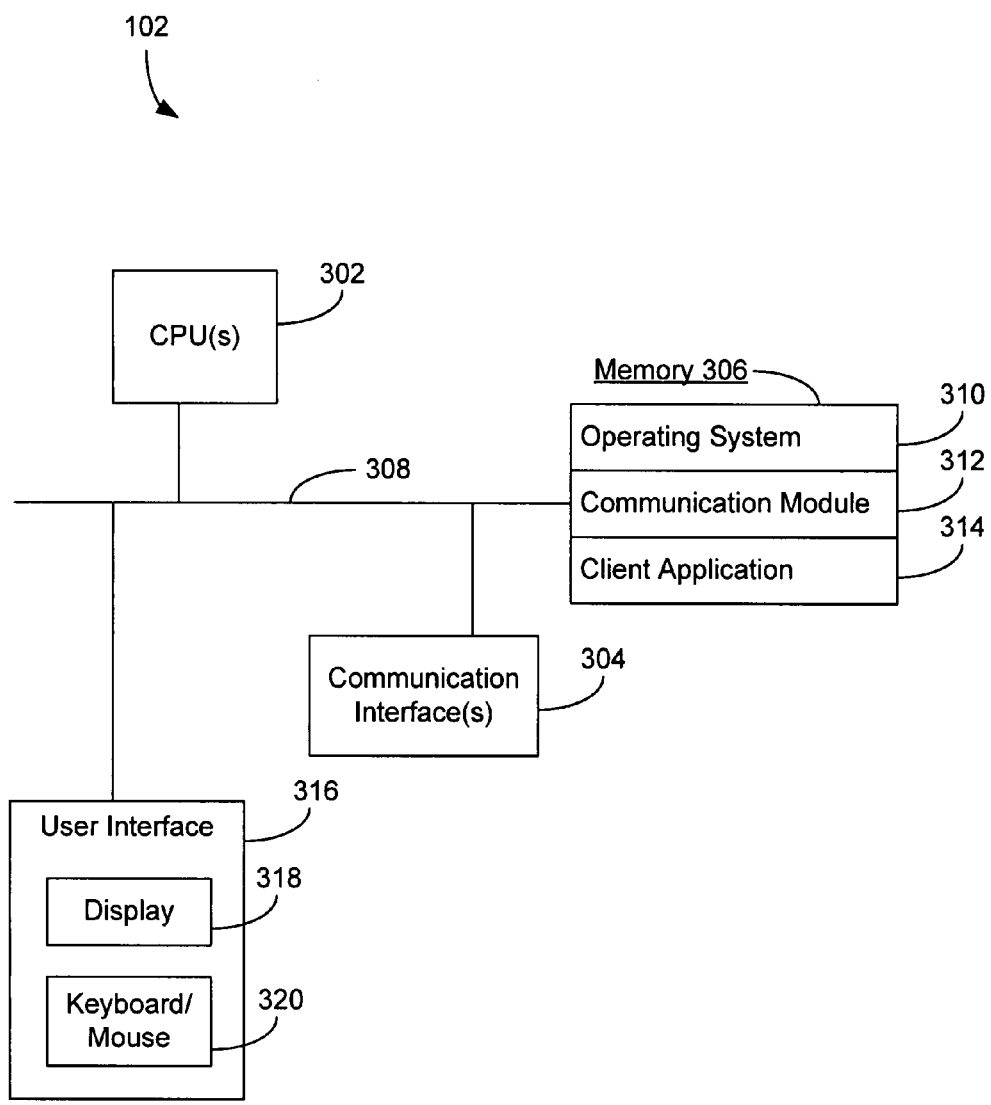
FIG. 3 is a block diagram illustrating a client, in accordance with some embodiments.

FIG. 3 is a block diagram illustrating a client 102, in accordance with some embodiments. The client 102 typically includes one or more processing units (CPU's) 302, one or more network or other communications interfaces 304, memory 306, and one or more communication buses 308 for interconnecting these components. The client 102 optionally may include a user interface 316 comprising a display device 318 and an input device 320, such as a keyboard and/or a mouse 320 (though the user interface 316 can encompass any alternative arrangement of output and/or input devices, such as devices that employ audio or Braille output, retinal projection, stimulation of other senses, such as taste or smell, or even direct neural stimulation). The memory 306 includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. In some embodiments, memory 306 stores the following programs, modules and data structures, or a subset thereof:

- an operating system 310 that includes procedures for handling various basic system services and for performing hardware dependent tasks;
- a network communication module 312 that is used for connecting the client 102 to other computers via the one or more communication network interfaces 304 (wired or wireless), such as the Internet, other wide area networks, local area networks, metropolitan area networks, and so on; and
- a client application 314.

The client application enables users of the client 102 to access the content system 104 and hosts 108 (FIG. 1). Examples of client applications include web browsers, email applications, and content feed (e.g., Really Simple Syndication, or RSS) aggregators.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules and data structures not described above.

Figure 4:
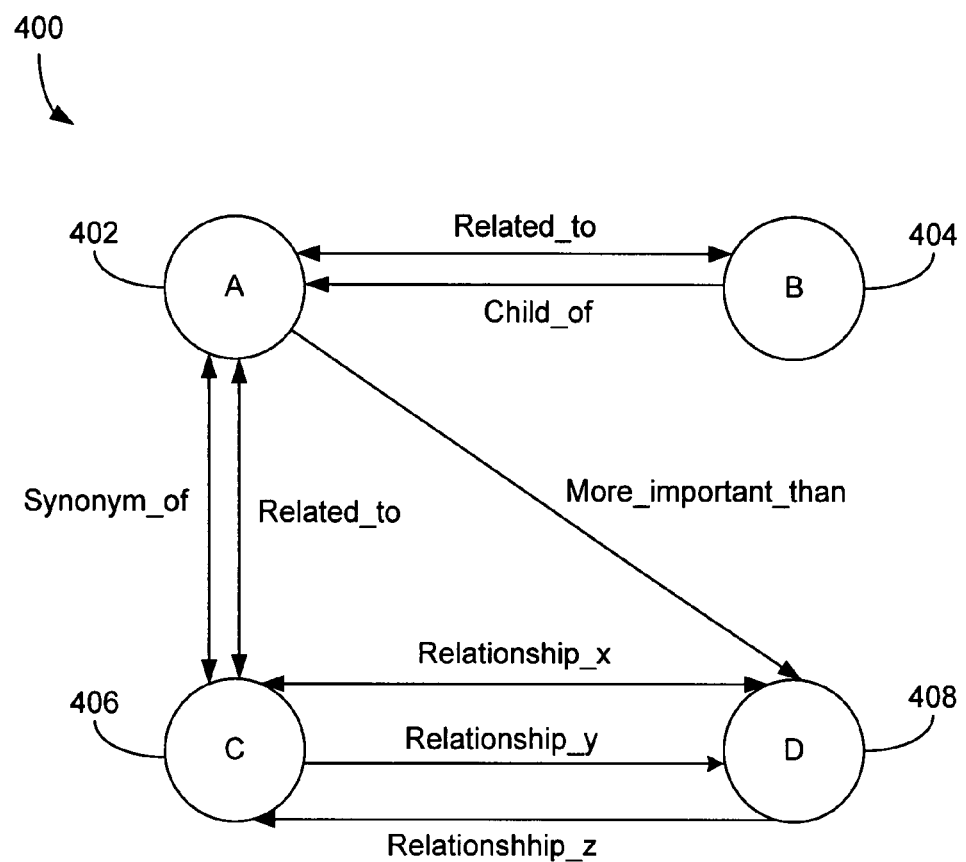
FIG. 4 illustrates a conceptual diagram of labels and relationships between labels, in accordance with some embodiments.

FIG. 4 illustrates a conceptual diagram of labels and relationships between labels, in accordance with some embodiments. Labels and relationships between the labels may be conceptualized as a directed graph 400, with nodes in the graph representing labels and the directed edges representing the relationships between labels. The edges may be unidirectional or bidirectional, depending on the relationship. It should be appreciated that the labels and relationships shown in FIG. 4 are merely exemplary and that the labels and relationships may be different from those shown.

The graph 400 includes four nodes representing labels: A 402, B 404, C 406, and D 408. The nodes are connected to each other by various directed edges. The edges specify the relationships between the labels. For example, nodes A 402 and B 404 are connected by a bidirectional "related_to" edge and a unidirectional "child_of" edge. The "related_to" edge specifies that labels A and B are related to each other. The "child_of" relationship edge specifies that label B is a child of label A. That is, label B is a sub-label of label A, similar to the relationship between a folder and sub-folders within the folder.

Label nodes A 402 and C 406 are connected by two bidirectional edges: "synonym_of" and "related_to." These edges specify that labels A and C are synonyms of each other and are related to each other. Label nodes A 402 and D 408 are connected by a unidirectional "more_important_than" edge, which specifies that label A (and content associated with label A) is more important than label D (and content associated with label D).

More generally, between any two nodes representing labels, there may be any number of edges, unidirectional or bidirectional, representing relationships between the labels. An example is shown with regard to label nodes C 406 and D 408. Nodes C and D are connected by a bidirectional edge "relationship_x" and two unidirectional edges "relationship_y" and "relationship_z," each going in opposite directions. It is possible for two nodes to have a unidirectional relationship in one direction and another, unrelated unidirectional relationship in the opposite direction. A relationship edge is represented by a bidirectional edge if the relationship is mutual. For example, synonym and related-to relationships are represented by bidirectional edges because both of these relationships are mutual; "A is a synonym of B" implies a mutual relationship "B is a synonym of A," and "A is related to B" implies a mutual relationship "B is related to A." A relationship is represented by a unidirectional edge if the relationship is not mutual. For example, child-of and more-important-than relationships are represented by unidirectional edges because both of these relationships are not mutual. Indeed, a unidirectional relationship often implies an opposite relationship in the other direction. For example, "A is a child of B" implies the opposite relationship "B is a parent of A," and "A is more important than B" implies the opposite relationship "B is less important than A."

Figure 5:
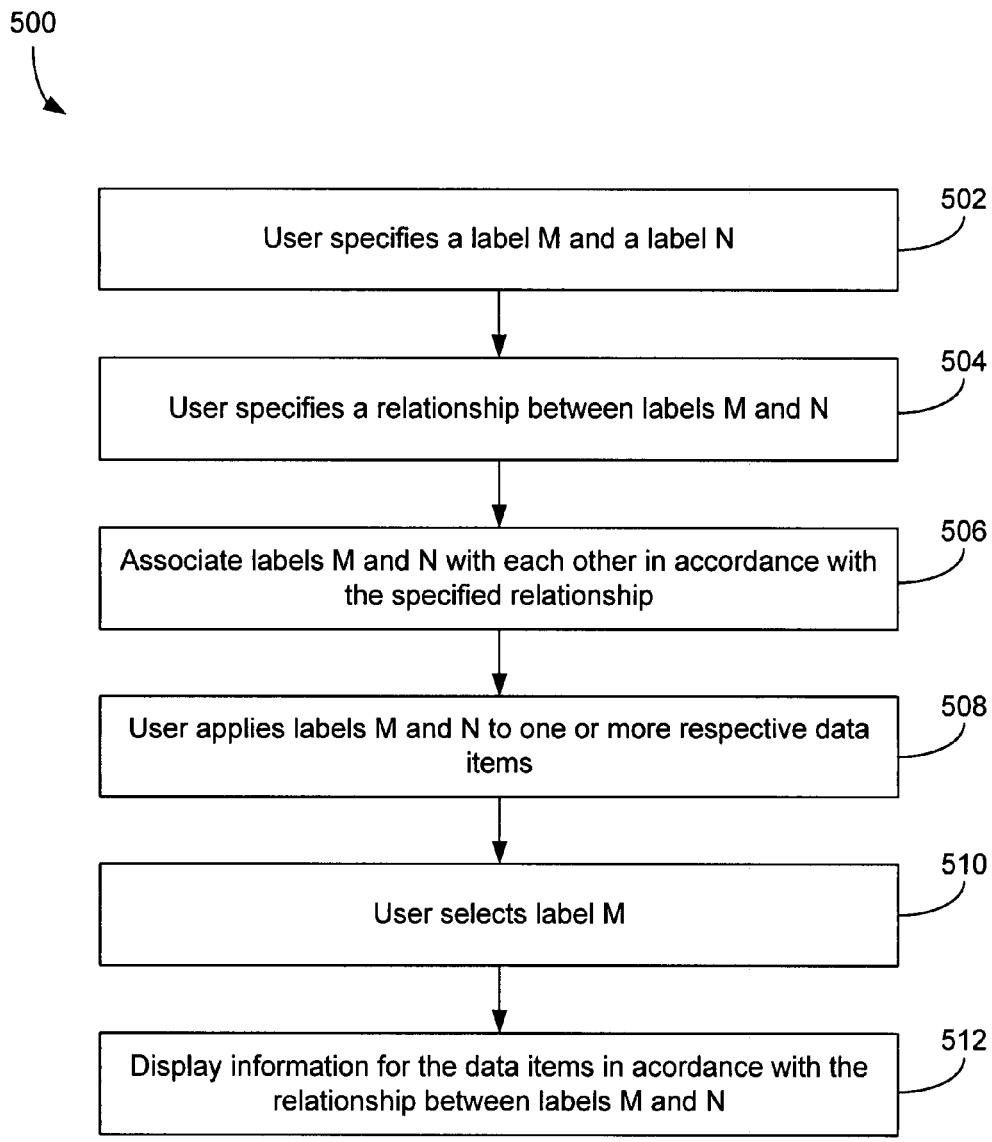
FIG. 5 is a flow diagram of a process for defining relationships between labels, in accordance with some embodiments.

FIG. 5 is a flow diagram of a process for defining relationships between labels, in accordance with some embodiments. In process flow 500, a user specifies a relationship between two labels. A user can use these labels to organize and manage content. Information corresponding to content associated with one label may be displayed when another label with which the first label has a relationship is selected by the user.

A user accesses his account in the content system 104 and provides a first label and a second label (hereinafter "M" and "N," respectively, for convenience) (502). The user may create the label(s), if they have not been created already. In some embodiments, a label is simply a string of characters. In some other embodiments, a label may include a character string and/or an image such as an icon. If the desired label has already been created, the user can also select the label from a list of existing labels. In some embodiments, the content system 104 may also provide one or more predefined labels for use by the user.

The user specifies a relationship between labels M and N (504). The relationship is identified by a character string and/or an image, such as an icon. The user may select a relationship from a list of predefined relationships provided by the content system 104. These predefined relationships include ones that are considered to be useful to users in their content organization and management tasks. These predefined relationships have semantic meanings that are known to the content system 104 and that should be apparent to the user from the character string identifying the relationship. In some embodiments, the predefined relationships include:

child-of: one label and contents associated with the label are subordinate to another label within an hierarchy; similar to the relationship between a sub-folder and a folder;

synonym-of: two labels are synonyms of each other or are equivalents of each other;

related-to: two labels are not necessarily equivalents but are related nonetheless;

member-of: one label is a member of a set identified by another label;

more-important-than: content associated with one label has higher priority than content associated with another label;

prerequisite-of: content (e.g., a task in a task list) associated with one label is necessary to operation of or on content associated with another label; and current-version-of: content associated with a first label are the most recent or newest of a class of content that associated both the first label and the second label.

It should be appreciated that the predefined relationships described above are merely exemplary. The content system 104 may provide other predefined relationships in addition to or in lieu of those described above.

In some embodiments, the user may also create an entirely arbitrary relationship by entering a character string identifying the relationship. The semantic meaning of such an arbitrary relationship is known only to the user-creator of the relationship, unlike the predefined relationships, whose semantic meanings are known to the content system 104.

The labels M and N are associated with each other in accordance with the specified relationship (506). The labels are applied to respective content or data items (508). That is, the content or data items are tagged with the labels and are associated with the labels in the content system 104. The content associated with the labels, including content that was associated with the labels before the creation of the relationship, are associated with each other in accordance with the relationship. The associations between labels and data items may be stored as a table of label-data item associations or some other sort of mapping from labels to data items or vice versa.

The user may later select one of the labels, say label M, in order to view information associated with that label (510). In some embodiments, the user can select the label by clicking on the label in the user interface. Information corresponding to content or data items associated with labels having a relationship with label M may be displayed to the user, in accordance with the relationship between labels M and N (512). For example, if label M is related to label N, then if label M is selected, information corresponding to content associated with label N may be displayed as related to label M. As another example, if content associated with labels M and N are tasks in a task list and label N is "a prerequisite of" label M, then when label M is selected, tasks associated with label N may be shown as prerequisites to the completion of tasks associated with label M.

Figure 6:
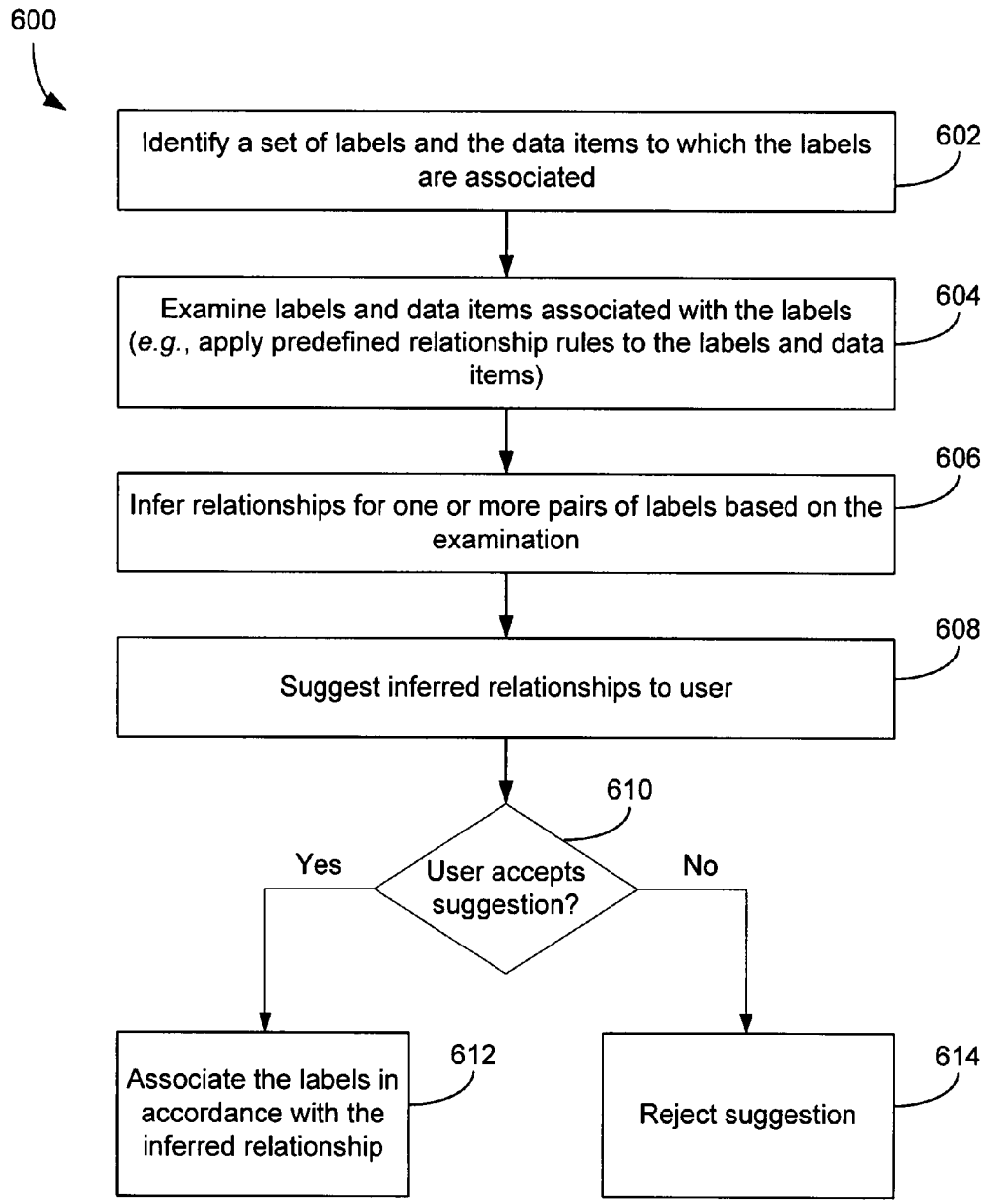
FIG. 6 is a flow diagram of a process for examining labels and associated data items and inferring label relationships from such examination, in accordance with some embodiments.

FIG. 6 is a flow diagram of a process for examining labels and associated data items and inferring label relationships from such examination, in accordance with some embodiments. Process flow 600 describes a process in which the content system 104 may infer and suggest label relationships to a user based on how the user (and, in some embodiments, other users) has labeled his content.

A set of labels and content associated with the labels are identified (602). The labels and the content are examined (604). In some embodiments, the examination includes examining the labels for similarity, common substrings, etc. and examining active associations and relationships between labels and content. In some other embodiments, the examination goes further and actually examines the content themselves.

In some embodiments, the examination includes applying pre-specified rules to the labels and content. The rules specify the circumstances under which a relationship between two labels may be inferred. For example, a rule may specify that if the content associated with a first label is a proper subset of content associated with a second label, then possible label relationships that may be inferred include, among others, a hierarchal or a "related to" relationship. In some embodiments, the relationship between respective labels may be discovered using a program that automatically evaluates the relatedness/similarity between the words and phrases that compose the labels.

For one or more pairings amongst the set of labels, relationships are inferred based on the examination (606). The inferred relationships are suggested to the user for creation (608). If the user accepts a suggestion (610—yes), then the corresponding relationship is created and the labels in the inferred relationship are associated with each other in accordance with the inferred relationship (612). If the suggestion is not accepted (610—no), then the suggested relationship is rejected (614).

Figure 11:
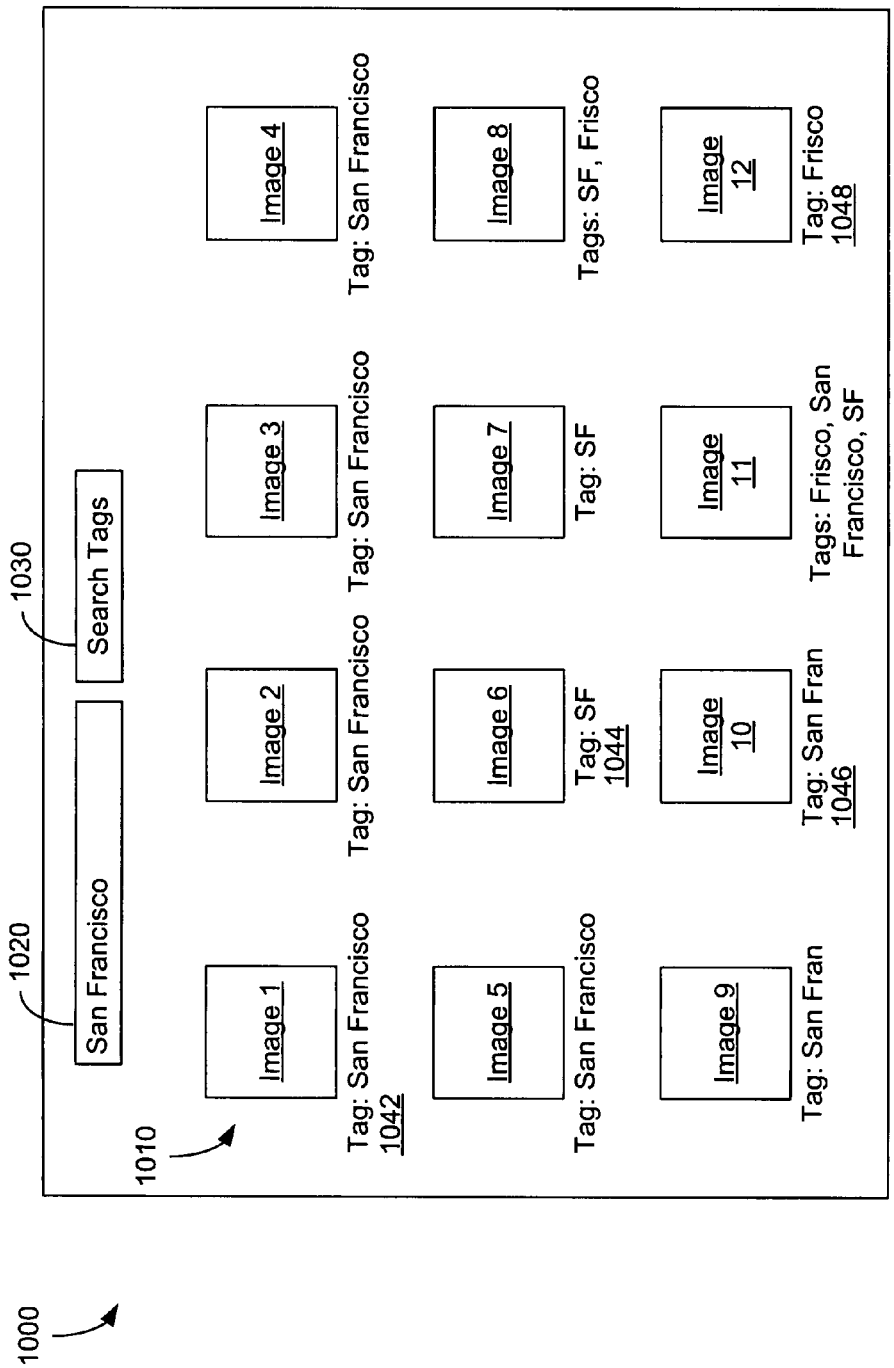

In a large body of collaboratively-tagged data, there will be a lot of redundancy and discrepancy between tags. For example, FIG. 11 shows the labels "SF," "San Francisco," and "Frisco," all of which presumably refer (redundantly) to the city of San Francisco. In some embodiments, if many people are tagging content, these tags could be applied redundantly to the same item, in whatever way makes the most sense to an individual user. From this redundant tagging, relationships can be inferred. For example, while most users might tag information about San Francisco as "san francisco", some might prefer "SF" or "Frisco." So, for example, if twenty percent of things tagged "san francisco" are also tagged "SF" or "Frisco", then in some embodiments it can be assumed that the former term ("san francisco") is at least 20% related to the latter ("SF" or "Frisco").

Conversely, if things tagged with the less-popular labels "SF" or "Frisco" are also tagged "San Francisco", then that implies an 80% relationship in the other direction—a user looking at items tagged "SF" is 80% likely to also be interested in items tagged "San Fransisco." In these embodiments the set of things tagged with the more popular term mostly contains the set of things tagged with the less-popular term, so, in the present example, it can be assumed that the labels "SF" and "Frisco" are very likely to related to the same thing as the label "San Francisco".

In other words, some embodiments can use the redundancy and discrepancies amongst the terms or labels used by various users to tag information to suggest relationships between those terms or labels.

In the embodiments described above the relatedness between labels is derived from data entered by multiple users who are tagging/labeling the same set of data. An example of an application where this might occur is "image search," where everyone is looking at the same pictures. Implied relationships derived from tags or labels can also be applied to situations where only one person does the tagging—such as in relation to a personal photo collection. This is because in a variety of embodiments the implied relationships derived from the tags can be applied to any set of tagged data based on knowledge of relationships between the tags, or labels.

FIG. 7 illustrates an exemplary data structure for storing label relationships, in accordance with some embodiments. The relationships between labels may be stored in the content system 104 in a table data structure 700. The table 700 stores relationships 702. Each relationship defines a row in the table. In some embodiments, the relationships are stored as character strings identifying the relationship. Each row also stores the two labels 704, 706 involved in the relationship. For unidirectional relationships, a label column 704 may be predefined to be the "tail" of the relationship, and the other label column 706 predefined to be the "head" of the relationship. That is, a unidirectional relationship is directed from the tail label in column 704 in the corresponding row to the head label in column 706 in the corresponding row. For example, row 708 specifies that the label "AcmeCo" is a child of the label "Clients." The relationship "child_of" is directed from tail label "AcmeCo" to head label "Clients." More generally, the table 700 may store any pair of labels associated with each other by a relationship, whether unidirectional or bidirectional. In some embodiments, the table 700 does not indicate whether a relationship is unidirectional or bidirectional. For pre-made relationships, the directions of the relationships are known to the content system. User-created relationships may be treated as bidirectional. In some other embodiments, the table 700 may indicate the direction of the relationships.

Figure 8:
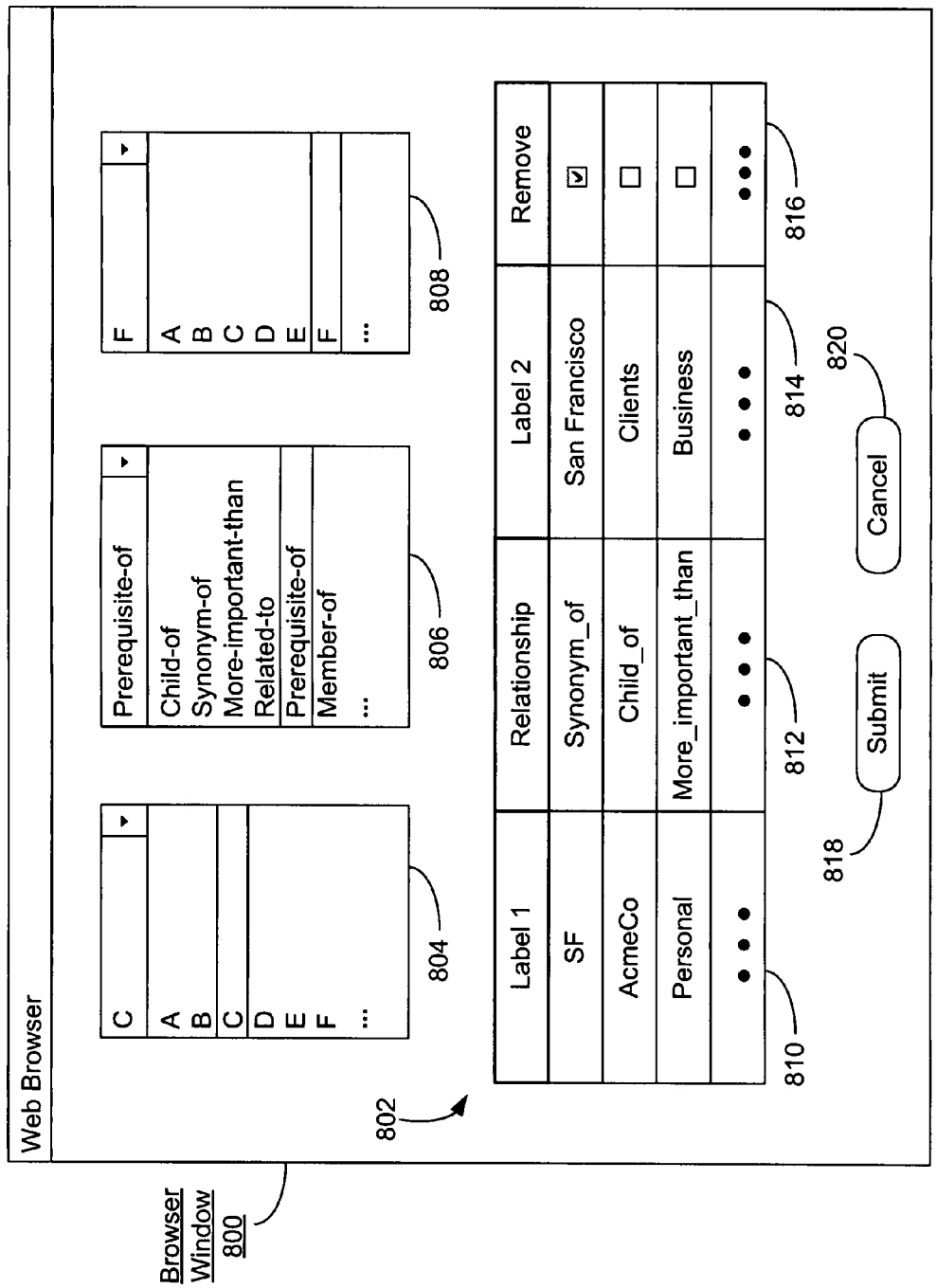
FIG. 8 illustrates an exemplary user interface for specifying relationships between labels, in accordance with some embodiments.

FIG. 8 illustrates an exemplary user interface for specifying relationships between labels, in accordance with some embodiments. In some embodiments, a user's labels and label relationships may be viewed by the user from a web browser. From a web browser window 800, the user may access an interface for reviewing and editing labels and relationships between labels. An exemplary labels and relationships interface may include a plurality of pull-down menus 804, 806, 808. A first label menu 804 shows the list of labels under the user's account and also allows the user to type in a new label. A relationships menu 806 shows a list of available relationships and also allows the user to type in a new relationship. A second label menu 808 also shows the list of labels under the user's account and also allows the user to type in a new label.

To create a relationship, the user types in or selects a first label in the label menu 804, a second label in label menu 808, and types in or selects a relationship in the relationships menu 806. The user may then click a submit button 818 to create the relationship or click a cancel button 820 to cancel. If the selected relationship is a unidirectional relationship, then the first label may be treated as the "tail" and the second label as the "head" of the relationship.

The interface may also show a table 802 of active label relationships. The table 802 includes a tail label column 810, a relationships column 812, and a head label column 814, similar to the table data structure 700. The table 802 may also include checkboxes 816 where the user can indicate relationships to be removed (deleted) upon clicking of the submit button 818.

The interface may also include a tool for deleting labels (not shown). When a label is deleted, all relationships involving that label are deleted as well. Content associated with the deleted label remains but loses the deleted label.

Figure 9:
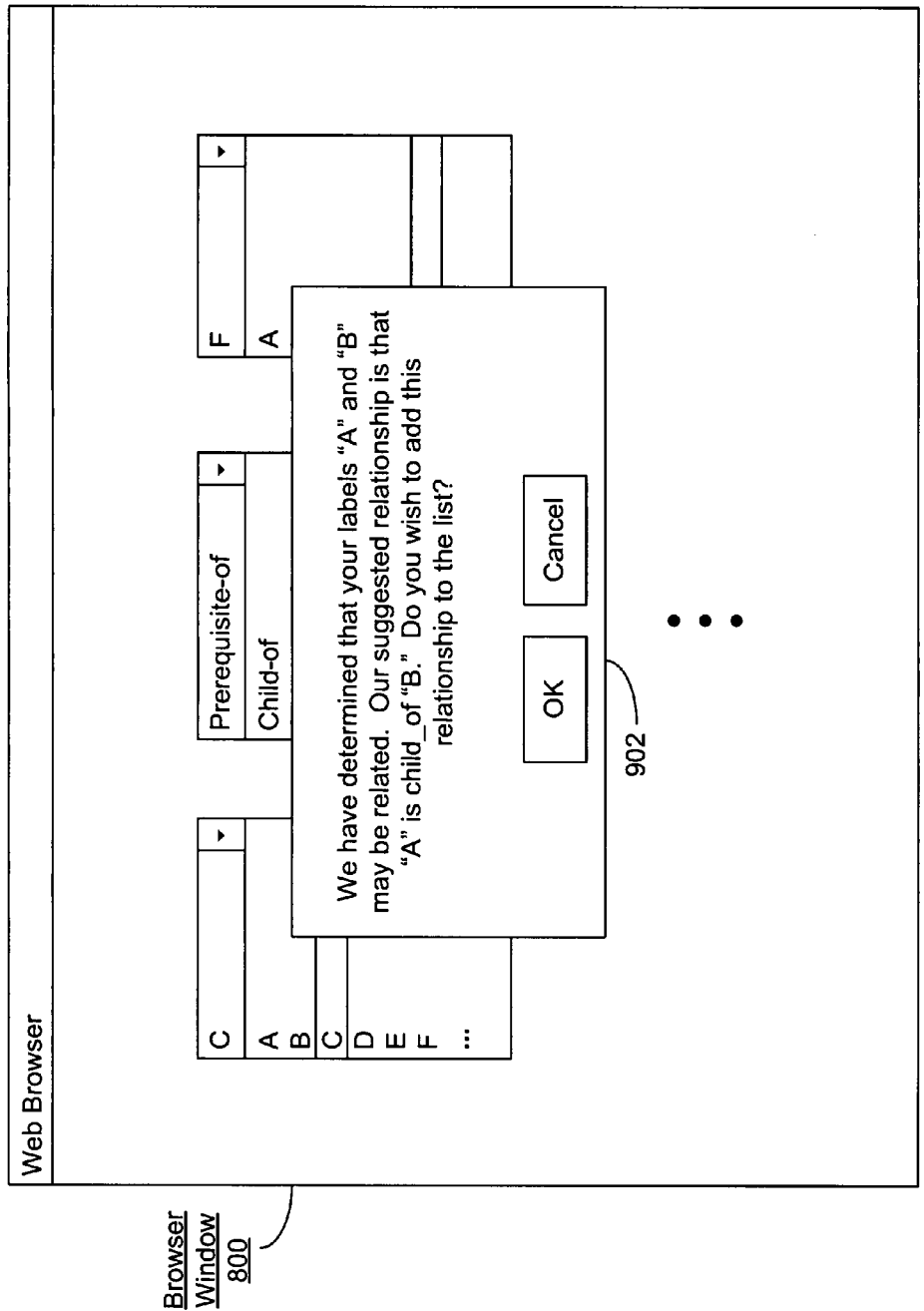
FIG. 9 illustrates an exemplary user interface for notifying a user of an inferred label relationship, in accordance with some embodiments.

FIG. 9 illustrates an exemplary user interface for notifying a user of an inferred label relationship, in accordance with some embodiments. As described above, the content system 104 may discover possible relationships between labels and suggest to the user that such a relationship be created. When the user accesses the labels and relationships interface via a browser window 800, an alert 902 may be shown whenever a relationship has been discovered. The alert may show the suggested relationship and ask the user to approve or reject creation of the relationship. If the user approves, the suggested relationship is created. If the user rejects, the suggested relationship is not created.

Figure 10:
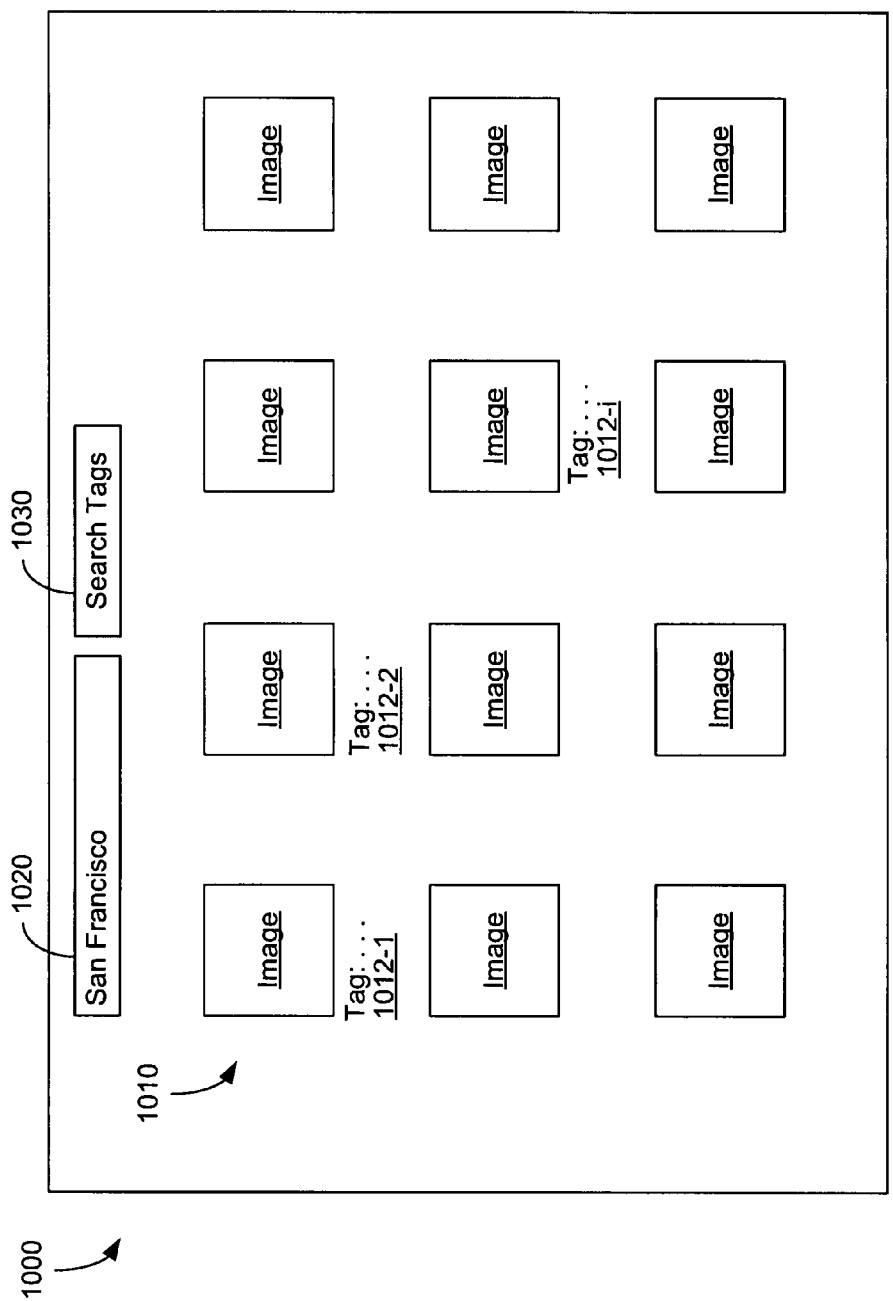
FIGS. 10-11 illustrate an interface for an exemplary image database website in accordance with some embodiments.

Attention is now directed to applications of labels associated with each other in accordance with the embodiments described above. FIGS. 10-11 illustrate an interface 1000 for an exemplary image database website in accordance with some embodiments. The exemplary image database website interface 1000 may show one or more images 1010 based on any suitable criteria, such as the most recently added images or the most frequently accessed images within a specified time frame. The images 1010 in the database may be tagged with one or more tags 1012. Furthermore, the tags 1012 may be related to each other in accordance with the embodiments described above. The interface 1000 also includes a search box 1020 for searching images based on the tags 1012 applied to the images. In FIG. 10, the search query "San Francisco" is typed into the search box 1020. Thus, the query, which in some embodiments is initiated by selection of a "Search Tags" button 1030, is for images tagged with "San Francisco" or with any tag 1012 that is a synonym of "San Francisco" based on the relationships between the tags. The result of the search is shown in FIG. 11. The images 1010 that are displayed are all tagged with one or more of "San Francisco" 1042, or synonyms thereof, such as "SF" 1044, "San Fran" 1046, and "Frisco" 1048. It should be appreciated that the synonyms are recognized as such because a user added the relationship between the tag "San Francisco" and the synonym tags to the image database. Alternatively, as described above, the relationship between labels and their associated images can be discovered from examination of redundant or disparate tags assigned to the same images by one or more users.

Figure 12:
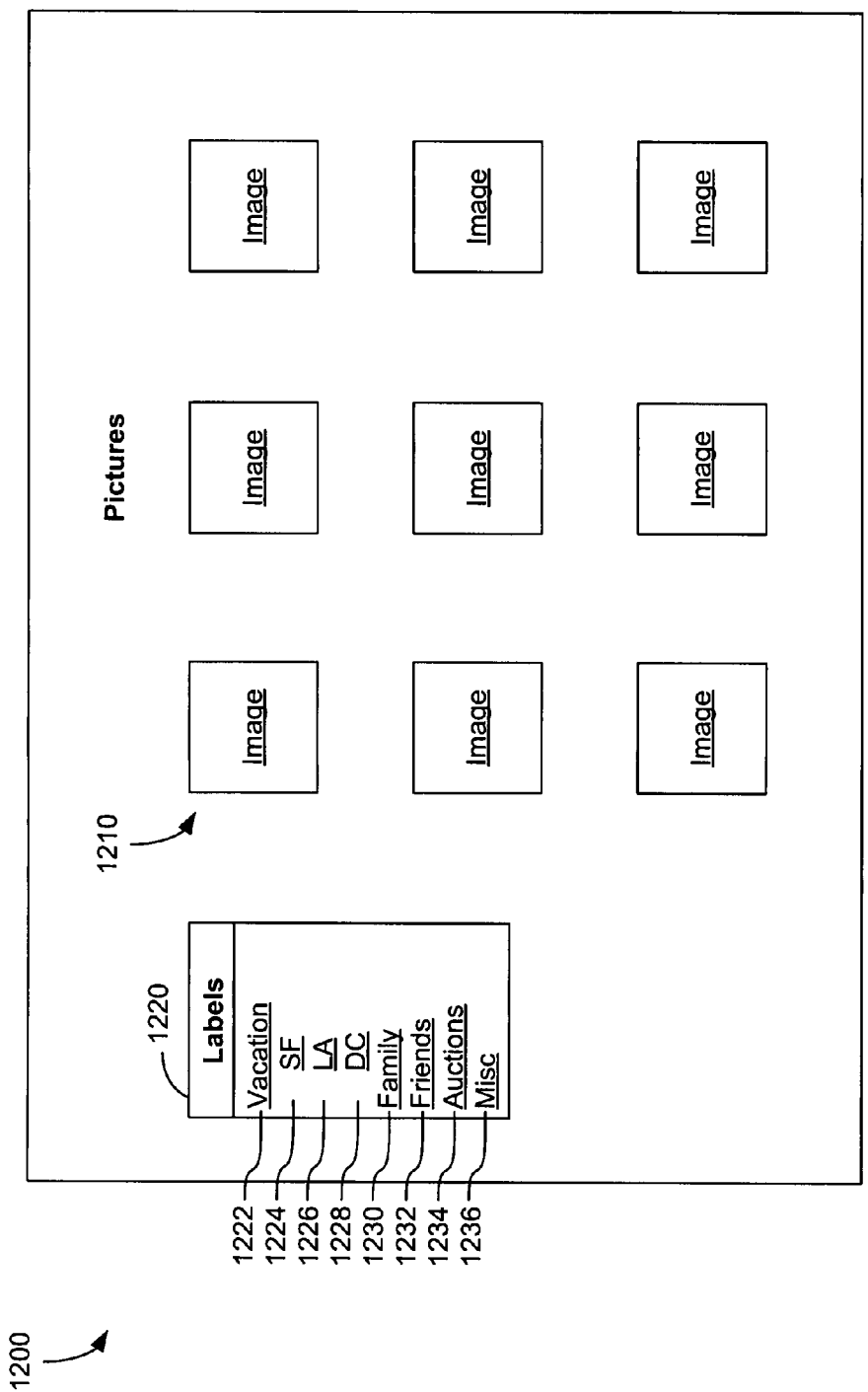
FIGS. 12-13 illustrate an interface for an exemplary image organizer application in accordance with some embodiments.
Figure 13:
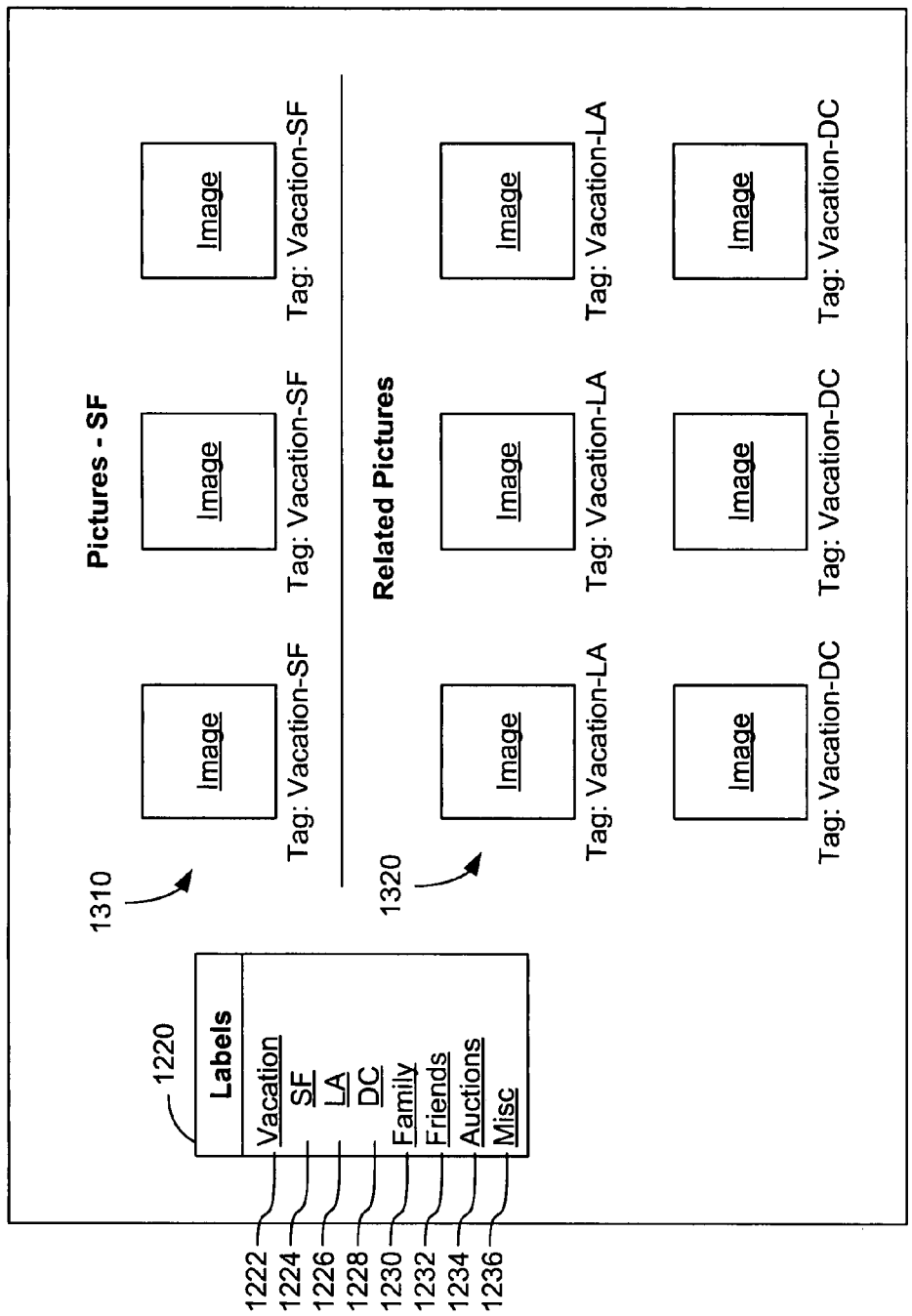

FIGS. 12-13 illustrate an interface 1200 for an exemplary image organizer application in accordance with some embodiments. The image organizer interface displays a plurality of images 1210. On a sidebar 1220 of the interface are labels that have been applied to images organized by the organizer. The labels may be related to one another in accordance with the embodiments described above. For example, the labels "SF" 1224, "LA" 1226, and "DC" 1228 are children of the label "Vacation" 1222. Other possible labels include: "Family" 1230, "Friends" 1232, "Auctions" 1234 and "Miscellaneous" 1236. Selection of the label "SF" 1224 by the user brings up the images 1310 associated with the label "SF," as shown in FIG. 13. The images 1310 are also associated with the label "Vacation" because of the child-of relationship between the labels "SF" 1224 and "Vacation" 1222. Also displayed are images 1320 that are not labeled "SF" but are related to the images 1310 labeled "SF" based on the relationships between the labels, such as images labeled "LA" and "DC." The labels "LA" 1226 and "DC" 1228 are related to the label "SF" based on the fact that all three are children of the label "Vacation" 1222.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of labeling data items, comprising:
at a computer system having one or more processors and memory storing programs executed by the one or more processors:
identifying a first label and a second label;
receiving a user specification of a first relationship between the first label and the second label and a second relationship between the second label and the first label, respectively, wherein the first relationship is distinct from the second relationship;
associating the first label with the second label in accordance with the first relationship and the second relationship, respectively;
applying the first label to a first subset of the data items and the second label to a second subset of the data items;
in response to a selection of the first label alone, preparing for display of a first view of information associated with the first subset of the data items and information associated with the second subset of the data items based on the first relationship; and
in response to a selection of the second label alone, preparing for display of a second view of information associated with the first subset of the data items and information associated with the second subset of the data items based on the second relationship;
wherein the first and second labels are distinct from a logical storage scheme associated with the data items and the second view is visually distinct from the first view.

2. The method of claim 1, wherein receiving the specification of the relationship comprises receiving a specification of an arbitrary relationship between the first label and the second label.

3. The method of claim 1, wherein the relationship is a unidirectional relationship between the first label and the second label.

4. The method of claim 1, wherein there are a plurality of relationships between the first label and the second label.

5. The method of claim 4, wherein at least one of the plurality of relationship is a bidirectional relationship such that data items associated with one of the first and second labels are also associated with the other of the first and second labels.

6. The method of claim 4, wherein at least one of the plurality of relationship is a relationship inferred from an examination of the data items associated with the first label and the data items associated with the second label.

7. A method of associating labels, comprising:
at a computer system having one or more processors and memory storing programs executed by the one or more processors:
identifying a first label and a second label, the first and second labels associated with respective data items;
examining the first and second labels and the respective data items;
inferring a first relationship between the first label and the second label and a second relationship between the second label and the first label based on the examination, respectively, wherein the first relationship is distinct from the second relationship;

in response to a user acceptance of the inferred first and second relationships, associating the first label with the second label in accordance with the first and second relationships;

in response to a user selection of the first label alone, preparing for display of a first view including the data items associated with the first label and the data items associated with the second label based on the first relationship; and in response to a user selection of the second label alone, preparing for display of a second view including the data items associated with the second label and the data items associated with the first label based on the second relationship;

wherein the first and second labels are distinct from a logical storage scheme associated with the data items and the second view is visually distinct from the first view.

8. The method of claim 7, wherein inferring comprises applying one or more relationship rules to the first and second labels and their associations with the respective data items.

9. The method of claim 7, wherein the relationship is a unidirectional relationship between the first label and the second label.

10. The method of claim 7, wherein there are a plurality of relationships between the first label and the second label.

11. The method of claim 10, wherein at least one of the plurality of relationship is a bidirectional relationship such that data items associated with one of the first and second labels are also associated with the other of the first and second labels.

12. The method of claim 10, wherein at least one of the plurality of relationship is a relationship specified by a user through a graphical user interface of the computer system.

13. A system for labeling data items, comprising:
memory;
one or more processors;
a repository, the repository comprising one or more data items; and
one or more modules stored in the memory and configured for execution by the one or more processors, the one or more modules comprising instructions:
  to identify a first label and a second label;
  to receive a user specification of a first relationship between the first label and the second label and a second relationship between the second label and the first label, respectively, wherein the first relationship is distinct from the second relationship;
  to associate the first label with the second label in accordance with the first relationship and the second relationship, respectively;
  to apply the first label to a first subset of the data items and the second label to a second subset of the data items;
  in response to a selection of the first label alone, to prepare for display of a first view of information associated with the first subset of the data items and information associated with the second subset of the data items based on the first relationship; and
  in response to a selection the second label alone, to prepare for display of a second view of information associated with the first subset of the data items and information associated with the second subset of the data items based on the second relationship;
  wherein the first and second labels are distinct from a logical storage scheme associated with the data items and the second view is visually distinct from the first view.

14. A system for associating labels, comprising:
memory,
one or more processors; and
a relationship discovery module stored in the memory and configured for execution by the one or more processors, the relationship discovery module comprising instructions:
  to identify a first label and a second label, the first and second labels associated with respective data items;
  to examine the first and second labels and the respective data items;
  to infer a first relationship between the first label and the second label and a second relationship between the second label and the first label based on the examination, respectively, wherein the first relationship is distinct from the second relationship;
  to associate the first label with the second label in accordance with the first relationship and the second relationship, respectively, in response to a user acceptance of the inferred first relationship and second relationship;
  in response to a user selection of the first label alone, to prepare for display of a first view of the data items associated with the first label and the data items associated with the second label based on the first relationship; and
  in response to a user selection of the second label alone, to prepare for display of a second view of the data items associated with the first label and the data items associated with the second label based on the second relationship;
  wherein the first and second labels are distinct from a logical storage scheme associated with the data items and the second view is visually distinct from the first view.

15. A computer program product for use in conjunction with a computer system, the computer program product comprising a computer readable storage medium and a computer program mechanism embedded therein, the computer program mechanism comprising instructions:
  identifying a first label and a second label;
  receiving a user specification of a first relationship between the first label and the second label and a second relationship between the second label and the first label, respectively, wherein the first relationship is distinct from the second relationship;
  associating the first label with the second label in accordance with the first relationship and the second relationship, respectively;
  applying the first label to a first subset of the data items and the second label to a second subset of the data items;
  in response to a selection of the first label alone, preparing for display of a first view of information associated with the first subset of the data items and information associated with the second subset of the data items based on the first relationship; and
  in response to a selection of the second label alone, preparing for display of a second view of information associated with the first subset of the data items and information associated with the second subset of the data items based on the second relationship;

wherein the first and second labels are distinct from a logical storage scheme associated with the data items and the second view is visually distinct from the first view.

16. A computer program product for use in conjunction with a computer system, the computer program product comprising a computer readable storage medium and a computer program mechanism embedded therein, the computer program mechanism comprising instructions:
   identifying a first label and a second label, the first and second labels associated with respective data items;
   examining the first and second labels and the respective data items;
   inferring a first relationship between the first label and the second label and a second relationship between the second label and the first label based on the examination, respectively, wherein the first relationship is distinct from the second relationship;
   in response to a user acceptance of the inferred first relationship and the inferred second relationship, associating the first label with the second label in accordance with the first relationship and the second label with the first label in accordance with the second relationship, respectively;
   in response to a user selection of the first label alone, preparing for display of a first view of the data items associated with the first label and the data items associated with the second label based on the first relationship; and
   in response to a user selection of the second label alone, preparing for display of a second view of the data items associated with the first label and the data items associated with the second label based on the second relationship;
   wherein the first and second labels are distinct from a logical storage scheme associated with the data items and the second view is visually distinct from the first view.

17. A system, comprising:
memory,
one or more processors; and
one or more modules stored in the memory and configured for execution by the one or more processors, the one or more modules comprising instructions:
   means for identifying a first label and a second label;
   means for receiving a user specification of a first relationship between the first label and the second label and a second relationship between the second label and the first label, respectively, wherein the first relationship is distinct from the second relationship;
   means for associating the first label with the second label in accordance with the first relationship and the second relationship, respectively;
   means for applying the first label to a first subset of the data items and the second label to a second subset of the data items;
   means for in response to a selection of the first label alone, preparing for display of a first view of information associated with the first subset of the data items and information associated with the second subset of the data items based on the first relationship; and
   means for, in response to a selection of the second label alone, preparing for display of a second view of information associated with the first subset of the data items and information associated with the second subset of the data items based on the second relationship;
   wherein the first and second labels are distinct from a logical storage scheme associated with the data items and the second view is visually distinct from the first view.

18. A system, comprising:
memory,
one or more processors; and
a relationship discovery module stored in the memory and configured for execution by the one or more processors, the relationship discovery module comprising instructions:
   means for identifying a first label and a second label, the first and second labels associated with respective data items;
   means for examining the first and second labels and the respective data items;
   means for inferring a first relationship between the first label and the second label and a second relationship between the second label and the first label based on the examination, respectively, wherein the first relationship is distinct from the second relationship;
   means for associating the first label with the second label in accordance with the first relationship and the second relationship, respectively, in response to a user acceptance of the inferred first relationship and the inferred second relationship;
   means for, in response to a user selection of the first label alone, preparing for display of a first view of the data items associated with the first label and the data items associated with the second label based on the first relationship; and
   means for, in response to a user selection of the second label alone, preparing for display of a second view of the data items associated with the first label and the data items associated with the second label based on the second relationship;
   wherein the first and second labels are distinct from a logical storage scheme associated with the data items and the second view is visually distinct from the first view.

19. A method of labeling data items, comprising:
at a computer system having one or more processors and memory storing programs executed by the one or more processors:
   identifying a first label and a second label and a third label;
   receiving a user specification of a first relationship between the first label and the third label and a second relationship between the second label and the third label;
   associating the first label with the third label in accordance with the first relationship and the second label with the third label in accordance with the second relationship;
   applying the first label to a first subset of the data items and the second label to a second subset of the data items;
   in response to a user selection of the first label, preparing for display of a first view of information associated with the first subset of the data items and information associated with the second subset of the data items based on the first relationship and the second relationship; and
   in response to a user selection of the second label, preparing for display of a second view of information associated with the first subset of the data items and information associated with the second subset of the data items based on the first relationship and the second relationship, wherein the second view is visually distinct from the first view.

20. The method of claim 19, wherein there is at least one indicator that visually distinguishes the information associated with the first subset of the data items from the information associated with the second subset of the data items.

* * * * *